(12) United States Patent
Vreeland et al.

(10) Patent No.: US 9,518,768 B2
(45) Date of Patent: Dec. 13, 2016

(54) EVAPORATOR HAVING A PHASE CHANGE MATERIAL LOUVERED CLAM SHELL HOUSING

(71) Applicant: MAHLE International GmbH, Stuttgart (DE)

(72) Inventors: Gary S. Vreeland, Medina, NY (US); Scott B. Lipa, Snyder, NY (US)

(73) Assignee: MAHLE International GmbH, Stuttgart (DE)

( * ) Notice: Subject to any disclaimer, the term of this patent is extended or adjusted under 35 U.S.C. 154(b) by 312 days.

(21) Appl. No.: 14/019,775

(22) Filed: Sep. 6, 2013

(65) Prior Publication Data

US 2014/0000309 A1 Jan. 2, 2014

Related U.S. Application Data

(63) Continuation-in-part of application No. 13/451,665, filed on Apr. 20, 2012, now Pat. No. 9,150,081, which
(Continued)

(51) Int. Cl.
| | |
|---|---|
| *F25B 39/02* | (2006.01) |
| *B60H 1/00* | (2006.01) |
| *F28F 21/08* | (2006.01) |
| *F28D 1/03* | (2006.01) |
| *F28D 20/02* | (2006.01) |

(Continued)

(52) U.S. Cl.
CPC ............ *F25B 39/022* (2013.01); *B60H 1/005* (2013.01); *F28D 1/0341* (2013.01); *F28D 9/005* (2013.01); *F28D 20/02* (2013.01); *F28F 21/08* (2013.01); *F25B 2400/24* (2013.01); *F28D 2020/0013* (2013.01); *F28D 2021/0085* (2013.01); *Y02E 60/145* (2013.01)

(58) Field of Classification Search
CPC .......... F25B 39/02; F25B 39/022; F25D 16/00
USPC ....................................... 62/515, 524
See application file for complete search history.

(56) References Cited

U.S. PATENT DOCUMENTS

| | | | | |
|---|---|---|---|---|
| 2002/0088246 A1* | 7/2002 | Bureau | ............... | B60H 1/00321 62/434 |
| 2002/0088248 A1* | 7/2002 | Bureau | ............... | B60H 1/00321 62/515 |

(Continued)

OTHER PUBLICATIONS

EP Search Report Dated Dec. 9, 2014.

*Primary Examiner* — Melvin Jones
(74) *Attorney, Agent, or Firm* — Brinks Gilson & Lione

(57) ABSTRACT

An evaporator having a phase change material clam shell housing is provided. The evaporator includes an upper manifold, a plurality of refrigerant tubes extending from the manifold, and a louvered clam shell housing defining a chamber for storing a phase change material. The louvered clam shell housing is disposed between and in thermal communication with the upper portion of two adjacent refrigerant tubes. The louvered clam shell housing is formed of two clam shell plates, each having louvers defined by slats folded into the phase change chamber. The folded slats define louver openings in the clam shell housing enabling the phase change material to make direct contact with the adjacent refrigerant tubes, thereby improving thermal communication between the refrigerant flowing in the tubes and the phase change material in the clam shell housing.

10 Claims, 4 Drawing Sheets

Related U.S. Application Data is a continuation-in-part of application No. 12/481,933, filed on Jun. 10, 2009, now Pat. No. 8,397,529.

(60) Provisional application No. 61/702,889, filed on Sep. 19, 2012.

(51) Int. Cl.
*F28D 9/00* (2006.01)
*F28D 21/00* (2006.01)
*F28D 20/00* (2006.01)

(56) References Cited

U.S. PATENT DOCUMENTS

| | | | |
|---|---|---|---|
| 2003/0131623 A1* | 7/2003 | Suppes | C09K 5/063 62/324.1 |
| 2007/0029075 A1* | 2/2007 | Mehendale | F28D 1/0333 165/153 |
| 2009/0007593 A1* | 1/2009 | Kerler | B60H 1/005 62/515 |
| 2012/0042687 A1 | 2/2012 | Kamoshida et al. | |
| 2012/0272679 A1 | 11/2012 | Vreeland | |
| 2013/0047663 A1 | 2/2013 | Kamoshida et al. | |
| 2013/0199760 A1 | 8/2013 | Kadle et al. | |
| 2013/0212881 A1 | 8/2013 | Kamoshida et al. | |

\* cited by examiner

EVAPORATOR HAVING A PHASE CHANGE MATERIAL LOUVERED CLAM SHELL HOUSING

CROSS REFERENCE TO RELATED APPLICATION

This application claims the benefit of U.S. Provisional Patent Application No. 61/702,889 for an EVAPORATOR PHASE CHANGE THERMAL SIPHON, filed on Sep. 19, 2012. This application is a continuation-in-part of U.S. patent application Ser. No. 13/451,665, filed on 20 Apr. 2012, which is a continuation-in-part of U.S. patent application Ser. No. 12/481,933, filed on 10 Jun. 2009. The disclosures of U.S. Provisional Patent Application No. 61/702,889, U.S. patent application Ser. No. 13/451,665, and U.S. patent application Ser. No. 12/481,933 are incorporated herein by reference.

TECHNICAL FIELD OF INVENTION

The disclosure relates to an air conditioning system for cooling the passenger compartment of an automobile; more particularly, to an evaporator of the air conditioning system; and still more particularly, to an evaporator having a phase change material.

BACKGROUND OF THE INVENTION

Fuel efficiency in an automobile may be enhanced by shutting off the gasoline engine during brief periods of time when power from the engine is not required for propulsion, such as when the automobile is coasting or temporarily stopped at an intersection. However, the compressor of a traditional air conditioning system runs off the crankshaft of the gasoline engine, and therefore, the engine continues to operate during those inefficient periods to provide cooling comfort for the passengers of the automobile.

U.S. Pat. No. 7,156,156, issued to Haller et al. on Jan. 2, 2007 (hereinafter referred to as Haller '156), provides one solution to the problem of the air conditioning system not functioning when the engine is not running. The Haller '156 patent shows an evaporator having a refrigerant flowing there-through for transferring heat from a flow of air to the refrigerant in a first operating mode with the engine of the automobile running. The evaporator includes a manifold extending in a horizontal direction. At least one tube is in fluid communication with manifold and extends downward in a vertical direction away from the manifold.

The evaporator defines at least one cavity, or tank, for storing a phase change material (PCM) to transfer heat from the PCM to the refrigerant to cool and freeze the PCM in the first operating mode with the engine of the automobile running. The cavities of the Haller '156 patent are disposed adjacent to and engaging the plurality of tubes. In a second operating mode with the engine of the automobile dormant, heat is transferred directly from the flow of air to the PCM in the cavities to cool the flow of air and to melt or warm the PCM.

There remains a continuing need for improved evaporators having a PCM to increase the efficiency of air conditioning systems that continue to operate during brief periods of time when the engine of the automobile is shut off to increase the fuel efficiency of the automobile.

SUMMARY OF THE INVENTION

The invention provides for an evaporator having at least one clam shell housing for the storage of a phase change material. The evaporator includes an upper manifold, a plurality of refrigerant tubes extending in a downward direction with respect to gravity from the upper manifold, and a louvered clam shell housing defining a chamber for storing a phase change material. The louvered clam shell housing is disposed between and in thermal communication with the upper portion of two adjacent refrigerant tubes. The louvered clam shell housing is formed of two clam shell plates, each having louvers defined by slats folded into the phase change material chamber. The folded slats define louver openings in the clam shell housing enabling the phase change material to make direct physical contact with the adjacent refrigerant tubes, thereby improving thermal communication between the refrigerant flowing in the tubes and the phase change material in the clam shell housing.

In the second operating mode, when the compressor is not cycling the refrigerant through the evaporator, heat is transferred from the refrigerant to the lower temperature PCM, thereby cooling and condensing the refrigerant. The heavier condensed refrigerant falls downward in the vertical direction through the tube. The condensed refrigerant then receives heat from the flow of ambient air through the core of the evaporator, thereby warming and evaporating the refrigerant. The lighter vapor phase refrigerant rises in the vertical direction returning to the lower temperature PCM to repeat the cycle.

The evaporator having phase change material louvered clam shell housings for an air conditioning system provides for an improved passive system for cooling the cabin of an automobile, both when the engine is dormant. It can also be used in a non-vehicular application. It is less voluminous, less costly and easier to manufacture, and more robust than the evaporators of the prior art that continue to operate when the engine of the automobile is dormant. Additionally, the louver openings defined by the slats folded inward on the clam shell plates permits the phase change material to have direct physical and thermal contact with the refrigerant tube, thereby increasing heat transfer efficiency. Lastly, it can be integrated into a pre-existing evaporator by disposing a phase change material clam shell housing between adjacent refrigerant tubes.

Other advantages of the present invention will be readily appreciated as the same becomes better understood by reference to the following detailed description when considered in connection with the accompanying drawings.

BRIEF DESCRIPTION OF THE DRAWINGS

This invention will be further described with reference to the accompanying drawings in which.

DETAILED DESCRIPTION OF THE INVENTION

Shown in the Figures, wherein like numerals indicate corresponding parts throughout the views, is a plate type evaporator 100 heat exchanger assembly having louvered clam shell housings 200 containing a phase change material (PCM) 250. The clam shell housings 200 enables a more efficient evaporator 100 that contains less mass and parts resulting in ease of manufacturability. The added advantages of the PCM louvered clam shell housings 200 will be readily appreciated, as the same becomes better understood by reference to the following detailed description when considered in connection with the accompanying drawings.

A typical air conditioning system for an automobile includes a compressor driven by the automobile's engine. The compressor cycles a two-phase refrigerant through an evaporator, in which the refrigerant expands into a vapor phase while extracting heat energy from a stream of ambient air flowing through the evaporator core, which is defined by the evaporator's refrigerant tubes and interconnecting fins, thereby cooling the air stream. The stream of cooled air may be routed to the automobile cabin to provide comfort cooling for the passengers.

For conservation of fuel, the engine of the automobile may be turned off at predetermined conditions, such as when the automobile is coasting down gradient or temporarily stopped at an intersection. During the period of time when the engine is turned off, the engine is not driving the compressor that cycles the refrigerant through the evaporator. The air conditioning system of such an automobile may be provided with an evaporator having a phase change material to extend the period of cooling to the passenger compartment when the engine is turned off and not driving the compressor.

Figure 1:
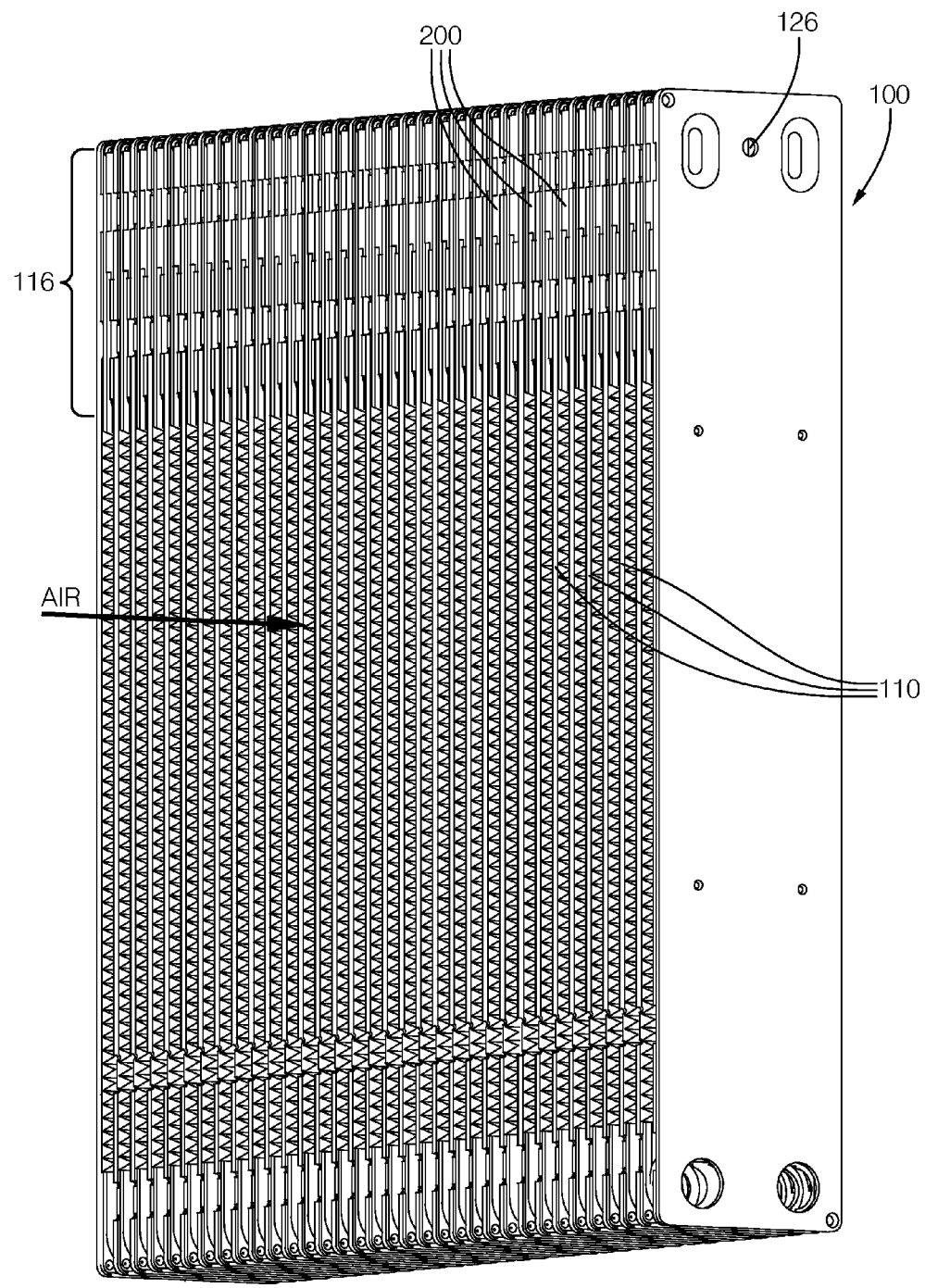
FIG. 1 is a perspective view of an exemplary embodiment of an evaporator having a phase change material contained within louvered clam shell housings positioned between adjacent refrigerant tubes.
Figure 2:
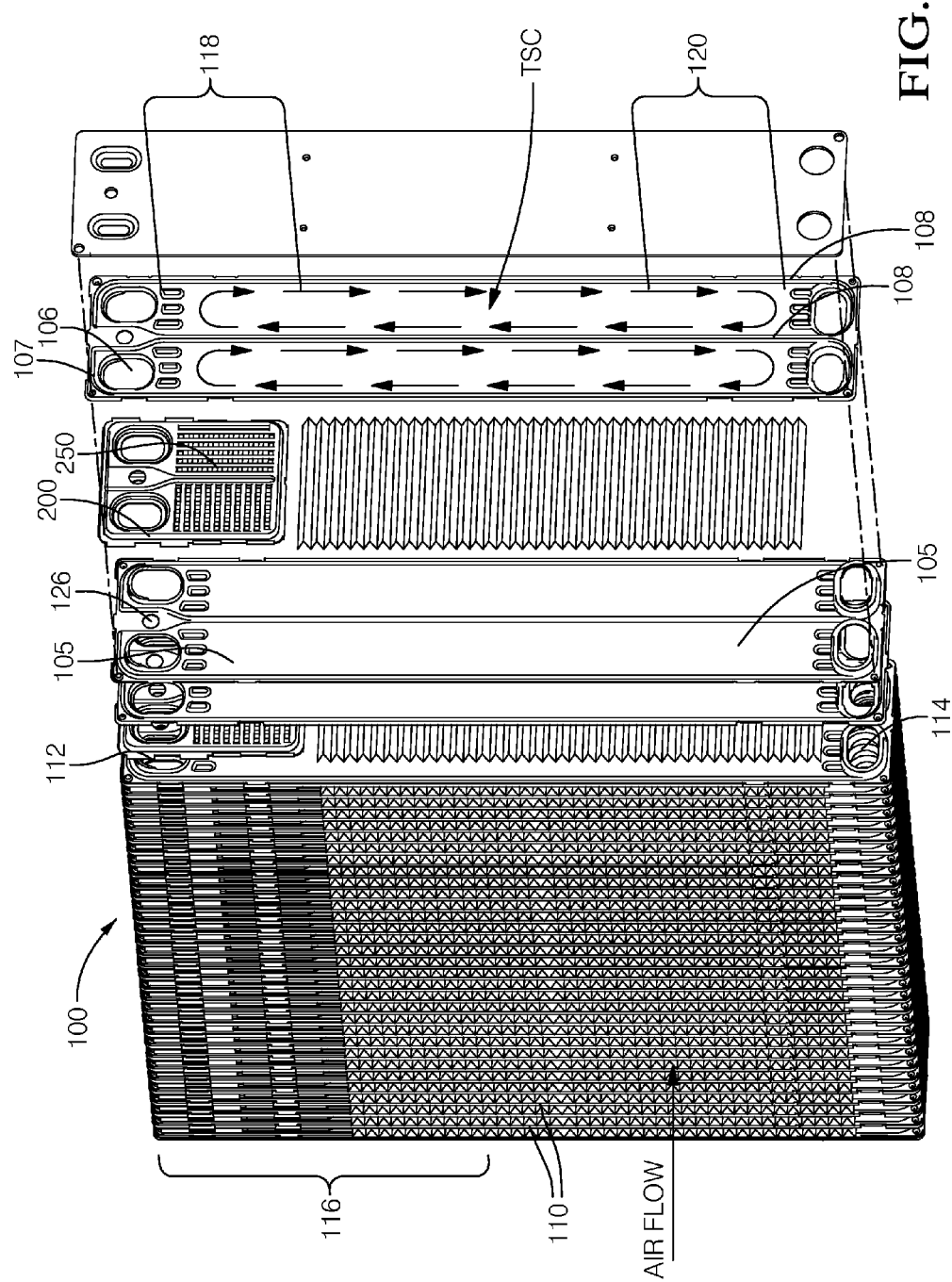
FIG. 2 is a perspective partially exploded view of the evaporator shown in FIG. 1.

Shown in FIGS. 1 and 2 is an exemplary embodiment of a plate type evaporator 100 having a plurality of louvered clam shell housings 200. The clam shell housings 200 contain a material (PCM) 250 that is in thermal communication with the top region 116 of the evaporator 100. The evaporator 100 may be manufactured from a plurality stamped metallic plates 105. Each of the stamped metallic plates 105 define features known to those of ordinary skill in the art, such as manifold openings 106, bosses 107 about the manifold openings 106, internal ribs 108, and flanges 109. The plurality of stamped metallic plates 105 are assembled into the plate type evaporator 100 by stacking the metallic plates 105 and then brazing the overall assembly. The manifold openings 106, bosses 107, internal ribs 108, and flanges 109 of each metallic plate cooperates with the corresponding manifold openings 106, bosses 107, internal ribs 108, and flanges 109 of the adjacent metallic plates 105 to define a pair of upper manifolds 112, a pair of lower manifolds 114, and a plurality of flat refrigerant tubes 110 hydraulically connecting the manifolds 112, 114. The terms upper and lower are used with respect to the direction of gravity.

A plurality of louvered clam shell housings 200 are disposed between the flat refrigerant tubes 110 near the top region 116 of the evaporator 100 adjacent the upper pair of manifolds 112. The louvered clam shell housings 200 may surround a portion of the pair of upper manifolds 112 or, as an alternative, may be positioned in the upper portion 118 of the flat refrigerant tubes 110 immediately below the upper manifolds 112. A PCM 250, such as a liquid saturated hydrocarbon having a molecular formula of $C_nH_{2n+2}$, a paraffin wax, or any other material that may remain in a liquid phase at room temperature, is disposed in each of the louvered clam shell housings 200. A heat conductive material such metallic particles or fibers may be added into the PCM 250 contained in the louvered clam shell housing 200 to increase the heat transfer efficiency.

Best shown in FIG. 2, when the air conditioning system is in the second operating mode, engine is turned off and the compressor is not cycling refrigerant through the evaporator 100, heat energy is transferred from the higher temperature vapor refrigerant within the flat refrigerant tubes 110 to the lower temperature PCM 250 contained in the louvered clam shell housing 200, thereby cooling and condensing the refrigerant into a liquid phase. As the higher density condensed liquid phase refrigerant drops downward toward the lower portion 120 of the flat refrigerant tubes 110 due to gravity, the refrigerant absorbs heat from the flow of ambient air stream and expands back into a vapor phase. The lower density vapor refrigerant floats upwardly toward the lower temperature PCM 250 where the vapor refrigerant is subsequently re-cooled and re-condensed to repeat the cycle. This cycling of the refrigerant within the refrigerant tube is referred to as a thermal siphon cycle as shown in FIG. 2 and referenced as TSC. By positioning the PCM 250 to be in thermal contact with only the upper portion 118 of the flat refrigerant tubes 110, the lower temperature PCM 250 induces a steady thermal siphon within the flat refrigerant tubes 110 that allows the refrigerant to continue to cool the on-coming air stream while the compressor is not operating for brief periods of time. The thermal siphon cycle continues until either the engine is powered on driving the compressor or the cooling capacity of the PCM 250 is depleted.

Figure 3:
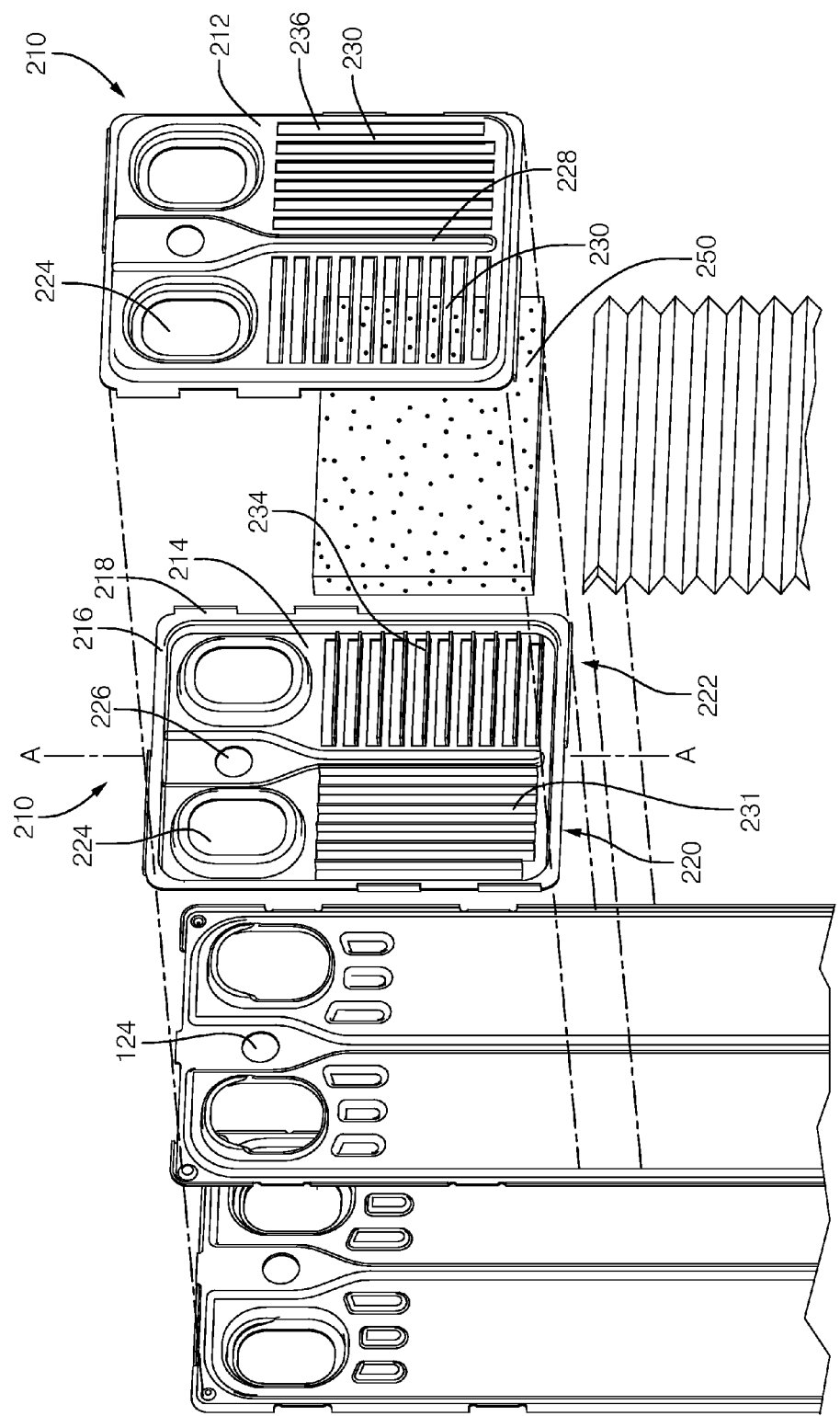
FIG. 3 is perspective exploded detailed view of the louvered clam shell housing containing a phase change material.

Referring to FIG. 3, each of the two clam shell plates 210 includes complementary features that allow the one clam shell plate 210 to be rotated 180 degrees about a central axis A and assembled onto the other clam shell plate 210 to form the louvered clam shell housing 200. The two clam shell plates 210 may be stamped or otherwise formed from a sheet of heat conductive material, such as aluminum, to define louvers 230, PCM ports 226, and upper manifold openings 224.

The upper portion 118 of the flat refrigerant tubes 110 may include through-holes 124 that extend from one surface of the refrigerant tube to the opposite surface of the refrigerant tube. The louvered clam shell housing 200 may include PCM ports 226 that cooperate with the through-holes 124 in the flat refrigerant tubes 110 to define a PCM passageway 126 through the heat exchanger assembly 100 for hydraulic communication of the PCM 250 between the louvered clam shell housing 200. The PCM 250 passageway 126 allows for the ease of filling the louvered clam shell housings 200 with the PCM 250 during manufacturing and also allows for the PCM 250 to migrate from one louvered clam shell housing 200 to another to account for unequal expansion and/or contraction of the PCM 250 in the louvered clam shell housing 200 due to thermal gradient across the evaporator 100.

Maintaining the PCM 250 immediately below the pair of upper manifolds 112 allows greater thermal conductivity between the PCM 250 and the refrigerant in the refrigerant tube. The length of the louvered clam shell housing 200 extending along the refrigerant tube may be adjusted to provide the desired volume of PCM 250 required to achieve the desire cooling performance while the air conditioning system is operating in the second mode, during which the compressor is not cycling refrigerant through the evaporator 100.

It is preferable to fill less than the full capacity of the louvered clam shell housing 200 with the PCM 250 to account for the volumetric expansion of the material at elevated temperatures up to 200° F. The position of the PCM port 226 is positioned with respect to the louvered clam shell housing 200 to allow the PCM 250 to migrate between the louvered clam shell housings 200. If the PCM 250 port 226 is too high, the PCM 250 cannot redistribute and equalization of the louvered clam shell housing 200 volume between spaces will not occur. A uniform distribution of PCM 250 will minimize cost and ensure optimum operation. If a louvered clam shell housing 200 has excess PCM 250, it will result in additional cost. With too little PCM 250, it will result in poor performance in that portion of the evaporator 100.

Figure 4:
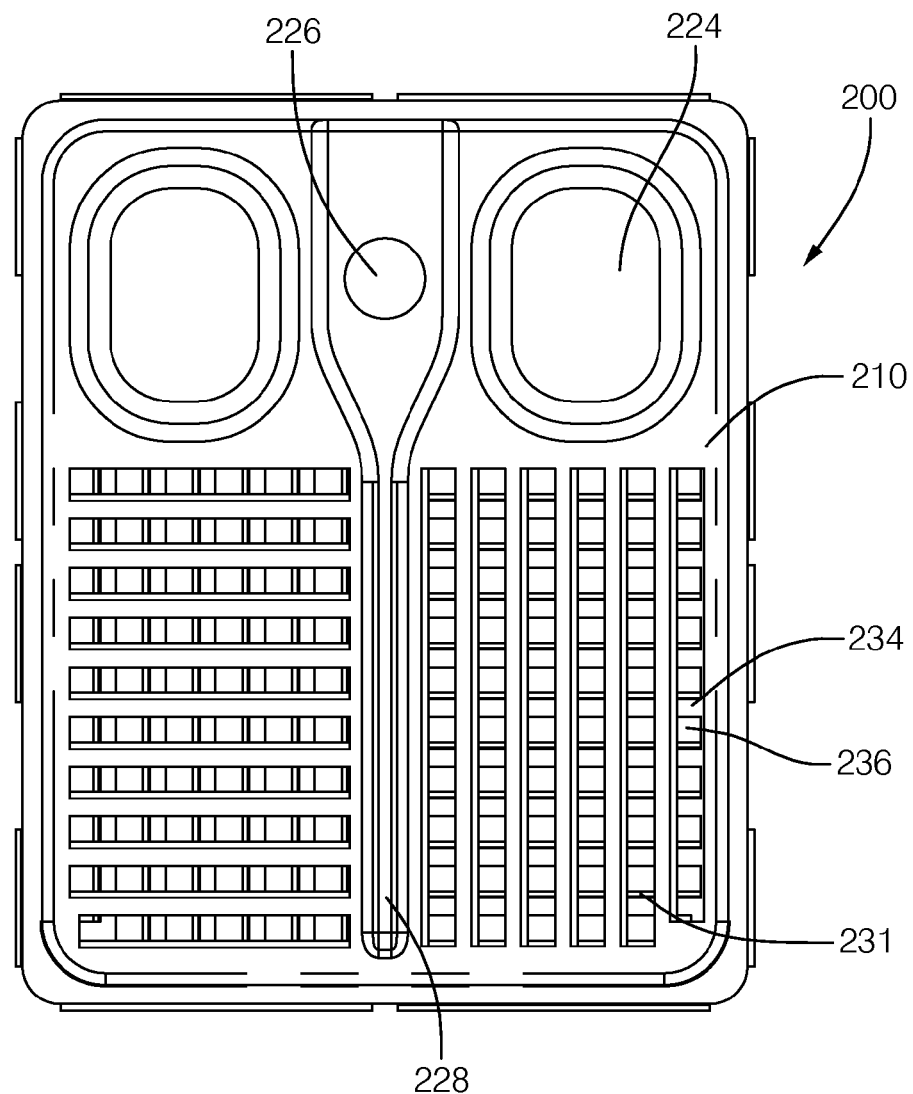
FIG. 4 shows an assembled clam shell housing of FIG. 3.

Referring to FIGS. 3 and 4, each of louvered clam shell housings 200 is assembled from two substantially identically formed clam shell plates 210. Each of the clam shell plates 210 includes an exterior surface 212, an interior surface 214 opposite that of the exterior surface 212, a rim 216 extending perpendicular from the perimeter of the interior surface 214, a plurality of tabs 218 extending from the rim 216, and a central rib 228 extending through a center axis (A). Each of the clam shell plates 210 further defines a pair of manifold openings 224 and a PCM port 226.

A plurality of louvers 230 is formed in a first portion 220 and second portion 222 located on either side of the central axis (A) below the respected manifold openings 224 of the clam shell plate 210. The louvers 230 may be formed by folding a plurality slats 231 defined between pairs of slits at approximately a right angle relative to the interior surface 214. To increase the number of louvers 230, long narrow bumps may be formed and subsequently slit to define rectangular shaped slats 231 having a length (L). A set of louvers 230 may extend in a first direction on one side of the central axis A and another set of louvers 230 may extend in a second direction on the other side of the central axis A. The first direction may be at a right angle to the central axis A and the second direction may be parallel to the central axis A.

The two clam shell plates 210 are assembled in a louvered clam shell housing 200 by first rotating one clam shell plate 210 180 degrees about the central axis (A) such that the interior surface 214 of one clam shell plate 210 is oriented toward the other. The two clam shell plates 210 are then brought together such that the rims 216 of each clam shell plates 210 are engaged to one another. The tabs 218 of one clam shell plate 210 cooperate with the tabs 218 of the other clam shell plate 210 to lock the two clam shell plates 210 together to provide the louvered clam shell housing 200 defining an interior PCM chamber 232.

Shown in FIG. 4, the rectangular slats 231 are bumped, slit, and folded such that the distal edges 234 of the louvers 230 of one clam shell plate 210 may engage the distal edges 234 of the louvers 230 of the other clam shell plate 210 at a 90 degree angle once the two clam shell plates 210 are joined. The crossing engagement of the distal edges 234 of the louvers 230 provides structural integrity to the clam shell housing 200 and in turn, increases the overall structural integrity of the plate type evaporator 100 once the clam shell housings 200 are assembled and brazed into position between the refrigerant tubes 110. The louver openings 236 defined in the clam shell plate 210 by the slitting and folding of the louvers 230 enables the PCM 250 to directly physically contact the exterior surfaces of the refrigerant tubes 110, thereby increasing thermal conductivity between the PCM 250 and refrigerant within the refrigerant tubes 110.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An evaporator for an air conditioning system, comprising:
   an upper manifold;
   a plurality of refrigerant tubes extending from and in hydraulic communication with said upper manifold; and
   a clam shell housing disposed between and in thermal communication with two adjacent refrigerant tubes;
   wherein said clam shell housing comprises two clam shell plates defining a chamber configured for storing a phase change material, and
   wherein one of said clam shell plates includes a first portion defining first portion louvers having distal louver edges extending into said chamber.

2. An evaporator for an air conditioning system, comprising:
   an upper manifold;
   a plurality of refrigerant tubes extending from and in hydraulic communication with said upper manifold; and
   a clam shell housing disposed between and in thermal communication with two adjacent refrigerant tubes;
   wherein said clam shell housing comprises two clam shell plates defining a chamber configured for storing a phase change material,
   wherein one of said clam shell plates includes a first portion defining first portion louvers having distal louver edges extending into said chamber, and
   wherein said first portion of said one of said clam shell plates further includes a plurality of parallel slats folded into said chamber to define said first portion louvers and corresponding first portion louver openings enabling direct physical contact between the phase change material and said refrigerant tubes.

3. The evaporator for an air conditioning system of claim 2, wherein said at least one of said clam shell plates further includes:
   a central rib extending long an axis-A partitioning said clam shell plate into said first portion and a second portion,
   wherein said second portion defines second portion louvers having distal louver edges extending into said phase change material chamber.

4. The evaporator for an air conditioning system of claim 3,
   wherein said second portion of said clam shell plates further includes a plurality of parallel slats folded into said chamber to define said second portion louvers and corresponding second portion louver openings.

5. The evaporator for an air conditioning system of claim 4, wherein said first portion louvers extends in a first direction and said second portion louvers extends in a second direction.

6. The evaporator for an air conditioning system of claim 5, wherein said first direction is 90 degrees relative to said second direction.

7. The evaporator for an air conditioning system of claim 6,
   wherein the other of said clam shell plates is substantially identical to said one of said clam shell plates and includes a second portion defining second portion louvers having distal louver edges;
wherein one of said clam shell plates is rotated 180 degrees about the A axis such that said first portion louvers of said one of said clam shell plates extends 90 degrees to said second portion louvers of said other of said clam shell plates.

8. The evaporator for an air conditioning system of claim 7, wherein said distal louver edges of said first portion of said one of clam shell plates are in contact with said distal louver edges of said second portion of said other of said clam shell plates.

9. The evaporator for an air conditioning system of claim 8, wherein the clam shell housing is configured to store phase change material such that the phase change material is in direct physical contact with only the upper portion of said of refrigerant tubes and below said upper manifold.

10. The evaporator for an air conditioning system of claim 8, wherein one of said clam shell plates defines a phase change material port located above said louvers.

* * * * *